(12) United States Patent
Anspaugh et al.

(10) Patent No.: US 8,888,131 B2
(45) Date of Patent: Nov. 18, 2014

(54) POSITION LOCK FOR STEERING COLUMN

(75) Inventors: Michael P. Anspaugh, Bay City, MI (US); Melvin Lee Tinnin, Clio, MI (US); John Schulz, Hemlock, MI (US); Donald A. Buzzard, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 298 days.

(21) Appl. No.: 13/537,436

(22) Filed: Jun. 29, 2012

(65) Prior Publication Data
US 2014/0000405 A1 Jan. 2, 2014

(51) Int. Cl.
*B62D 1/184* (2006.01)
*B62D 1/187* (2006.01)

(52) U.S. Cl.
USPC .................................... 280/775; 74/493

(58) Field of Classification Search
CPC ......... B62D 1/184; B62D 1/187; B62D 1/189
USPC .................................. 74/493; 280/775
See application file for complete search history.

(56) References Cited

U.S. PATENT DOCUMENTS

| | | | |
|---|---|---|---|
| 5,161,425 A * | 11/1992 | Baskett et al. ................... | 74/493 |
| 5,787,759 A * | 8/1998 | Olgren ............................. | 74/493 |
| 6,139,057 A | 10/2000 | Olgren et al. | |
| 6,419,269 B1 * | 7/2002 | Manwaring et al. .......... | 280/775 |
| 6,659,504 B2 * | 12/2003 | Riefe et al. ..................... | 280/777 |
| 6,761,376 B2 | 7/2004 | Riefe et al. | |
| 7,484,430 B2 * | 2/2009 | Schulz ............................. | 74/493 |
| 7,533,594 B2 * | 5/2009 | Menjak et al. ................... | 74/493 |
| 7,574,941 B2 | 8/2009 | Manwaring et al. | |
| 7,635,149 B2 * | 12/2009 | Menjak et al. ................ | 280/775 |
| 7,677,133 B2 * | 3/2010 | Matsui et al. ................... | 74/493 |
| 7,685,903 B2 * | 3/2010 | Streng et al. ................... | 74/493 |
| 7,735,868 B2 | 6/2010 | Ridgway et al. | |
| 7,819,426 B2 * | 10/2010 | Streng et al. ................. | 280/775 |
| 7,827,880 B2 * | 11/2010 | Riefe et al. ...................... | 74/493 |
| 7,861,615 B2 * | 1/2011 | Harris et al. ..................... | 74/493 |
| 8,047,096 B2 | 11/2011 | Ridgway et al. | |
| 8,327,733 B2 * | 12/2012 | Ozsoylu et al. ................. | 74/493 |
| 8,413,541 B2 * | 4/2013 | Davies et al. ................... | 74/493 |
| 8,505,408 B2 * | 8/2013 | Havlicek ........................ | 74/493 |
| 8,657,338 B2 * | 2/2014 | Buzzard et al. ............... | 280/775 |
| 8,671,795 B2 * | 3/2014 | Ozsoylu et al. ................. | 74/493 |
| 2006/0273568 A1 * | 12/2006 | Manwaring et al. .......... | 280/777 |
| 2012/0125139 A1 | 5/2012 | Tinnin et al. | |
| 2012/0304795 A1 * | 12/2012 | Tinnin et al. ................... | 74/493 |

* cited by examiner

*Primary Examiner* — Joseph M Rocca
*Assistant Examiner* — Laura Freedman
(74) *Attorney, Agent, or Firm* — Cantor Colburn LLP

(57) ABSTRACT

A position lock for a steering column comprises a rake lock bracket, a tooth lock, a driver, and a spring. The rake lock bracket is fixed to the vehicle has a rake lock tooth wall that bounds a control slot and that defines a plurality of rake lock teeth. The tooth lock is coupled to the steering column for movement in a raking direction and supported for rotation about a tooth lock rotation axis. The driver, supported for translation with the tooth lock and for rotation about a driver rotation axis, is configured for contacting an actuation feature of the tooth lock so as to cause the tooth lock to rotate with the driver as the driver rotates within the active range of rotation of the driver. The spring is configured and arranged to apply a biasing moment to cause the tooth lock to rotate in a locking direction.

20 Claims, 4 Drawing Sheets

POSITION LOCK FOR STEERING COLUMN

BACKGROUND OF THE INVENTION

The present invention relates generally to locking adjustment mechanisms for steering columns and more specifically to systems and methods for selectively fixing a position of a steering column assembly or facilitating adjustment of a steering column assembly in at least a raking direction.

Traditional locks for steering columns often provide inadequate load handling capabilities for preventing upward steering column displacements in the event of a vehicle collision. Some prior attempts to address this issue have sought use of interlocking teeth to provide the required vertical stability. Unfortunately, however, many configurations that employ interlocking teeth to provide for a positive lock, while providing for selective engagement and disengagement of the teeth for alternating adjustment and locking of the steering column, encounter practical difficulties. For example, one source of dissatisfaction with such locking mechanisms is that the need to interlock the teeth of one component with the teeth of another may limit the available lock positions to a predefined finite set of positions. This issue provides a motivation toward eliminating such toothed locking mechanisms altogether. Unfortunately, alternative locking mechanisms have sometimes been unable to reliably provide position assurance and resistance to unintended column displacements.

Accordingly, it is desirable to have a system and method for selectively fixing and adjusting a position of a steering column with improved fineness in the availability of adjustment positions and with improved reliability and security.

SUMMARY OF THE INVENTION

In a first aspect, an exemplary position lock for selectively resisting or facilitating raking movement of an adjustable steering column assembly of a vehicle comprises a rake lock bracket, a tooth lock, a driver, and a spring. The rake lock bracket is fixed to the vehicle and disposed adjacent to the steering column assembly along a direction of raking movement of the steering column. The rake lock bracket has a rake lock tooth wall that bounds a control slot and that defines a plurality of rake lock teeth. The tooth lock is coupled to the steering column for movement with the steering column in a raking direction. The tooth lock is also supported for rotation about a tooth lock rotation axis.

The driver, which is supported for translation with the tooth lock and for rotation about a driver rotation axis, is configured and positioned for contacting an actuation feature of the tooth lock within an active range of rotation of the driver so as to cause the tooth lock to rotate with the driver as the driver rotates within the active range of rotation of the driver. The spring is configured and arranged so as to apply a biasing moment tending to cause the tooth lock to rotate in a locking direction. The tooth lock is configured for engaging, upon rotation in the locking direction, at least one tooth of the plurality of rake lock teeth so as to selectively resist translation of the tooth lock and the steering column in the raking direction. The tooth lock is also configured for disengaging, upon rotation in an adjustment direction, from the at least one tooth of the plurality of rake lock teeth so as to selectively facilitate translation of the tooth lock and the steering column in the raking direction.

In a second aspect, an exemplary method for selectively resisting or facilitating raking movement of an adjustable steering column assembly of a vehicle comprises fixing a rake lock bracket to the vehicle, adjacent to the steering column assembly and along a direction of raking movement of the steering column. The rake lock bracket has a rake lock tooth wall that bounds a control slot and that defines a plurality of rake lock teeth. A tooth lock is coupled to the steering column for movement with the steering column in a raking direction and supported for rotation about a tooth lock rotation axis.

The method includes supporting the driver for translation with the tooth lock and for rotation about a driver rotation axis. The method also includes causing the tooth lock to rotate with the driver as the driver rotates within its active range of rotation. The tooth lock is rotated in the locking direction so as to engage at least one tooth of the plurality of rake lock teeth to resist translation of the steering column and is rotated in an adjustment direction so as to facilitate translation of the steering column in the raking direction.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
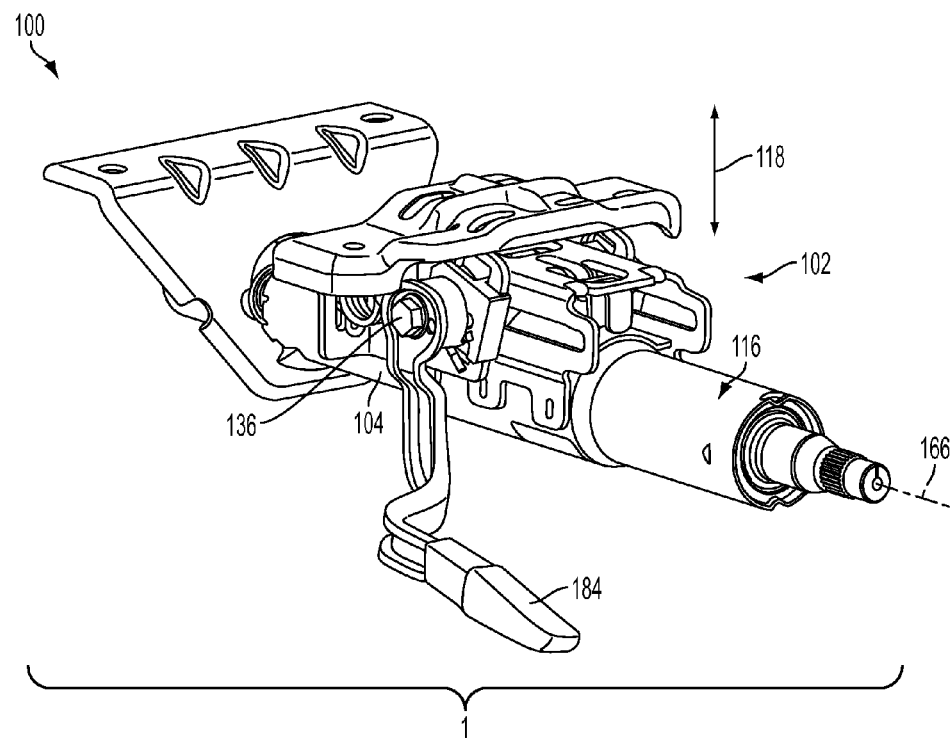
FIG. 1 illustrates a perspective view of an exemplary steering column assembly.

Referring now to the Figures, where the invention will be described with reference to specific embodiments, without limiting same, FIG. 1 illustrates an exemplary steering column assembly 100. As shown in FIG. 1, an exemplary steering column assembly 100 of a vehicle (not shown) comprises a steering column lock arm 184 for selectively resisting or facilitating raking movement of a steering column 116 within an adjustment range defined by a position lock 102. When the steering column lock arm 184 is positioned so as to place the position lock 102 in a locking mode, the steering column 116 is inhibited from being adjusted. Accordingly, the steering column 116 is relatively fixed, positionally, with respect to the vehicle. When the steering column lock arm 184 is positioned so as to place the position lock 102 in an adjustment mode, adjustments to the positioning of the steering column 116 are facilitated. Accordingly, the steering column 116 is relatively may be positionally adjusted relative to the vehicle. Once the steering column 116 occupies a desirable position, the steering column lock arm 184 may be re-positioned so as to return the position lock 102 to the locking mode.

Figure 2:
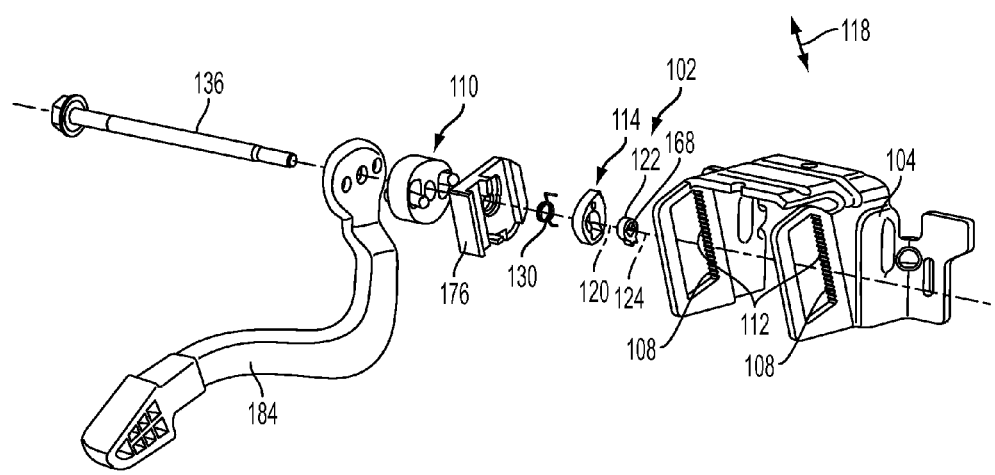
FIG. 2 illustrates an exploded perspective view of an exemplary position lock for a steering column.
Figure 6:
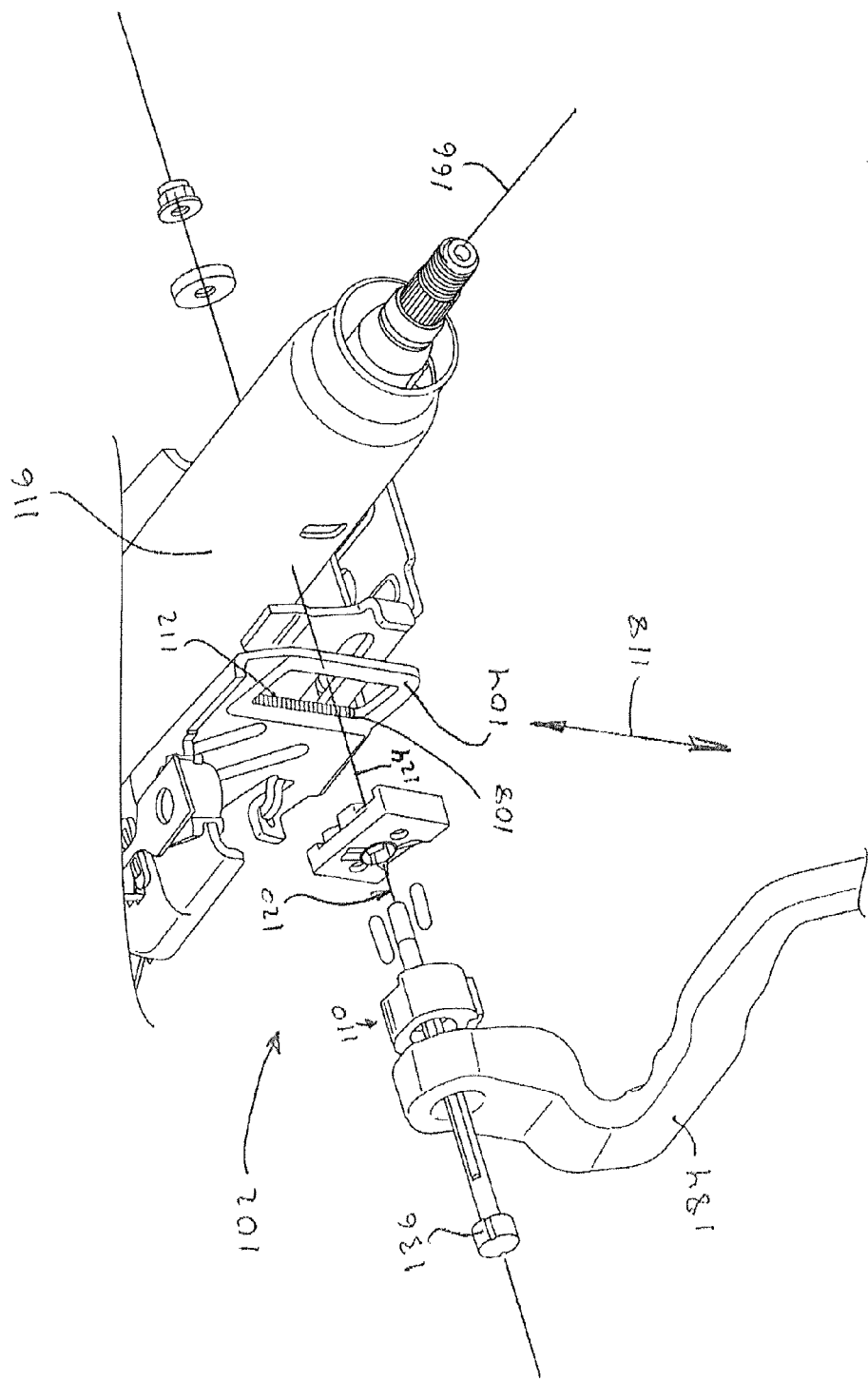
FIG. 6 illustrates an exploded perspective view of an exemplary position lock together with an adjustable steering column.

FIG. 2 and FIG. 6 show exploded views of an exemplary position lock 102. As shown in FIG. 2 and FIG. 6, in an exemplary embodiment, a position lock 102 for selectively resisting or facilitating raking adjustment of a steering column 116 of a vehicle includes a rake lock bracket 104. In an exemplary embodiment, the rake lock bracket 104 is fixed to a structure of the vehicle (not shown) and disposed adjacent to the steering column 116, along a raking direction 118 of the steering column 116. As shown in FIG. 2, an exemplary rake lock bracket 104 has a rake lock tooth wall 108 that bounds a control slot 178 (FIG. 4) and that defines a plurality of rake lock teeth 112. The rake lock tooth wall 108 with its plurality of rake lock teeth 112 provides a stationary structure against which a cooperating member may be engaged so as to lock the cooperating member to the stationary structure. It should be appreciated that locking surface features other than teeth (e.g., a rough or tacky surface) may be employed so as to provide a stationary structure against which a cooperating member may be engaged so as to lock the cooperating member to the stationary structure.

Figure 3:
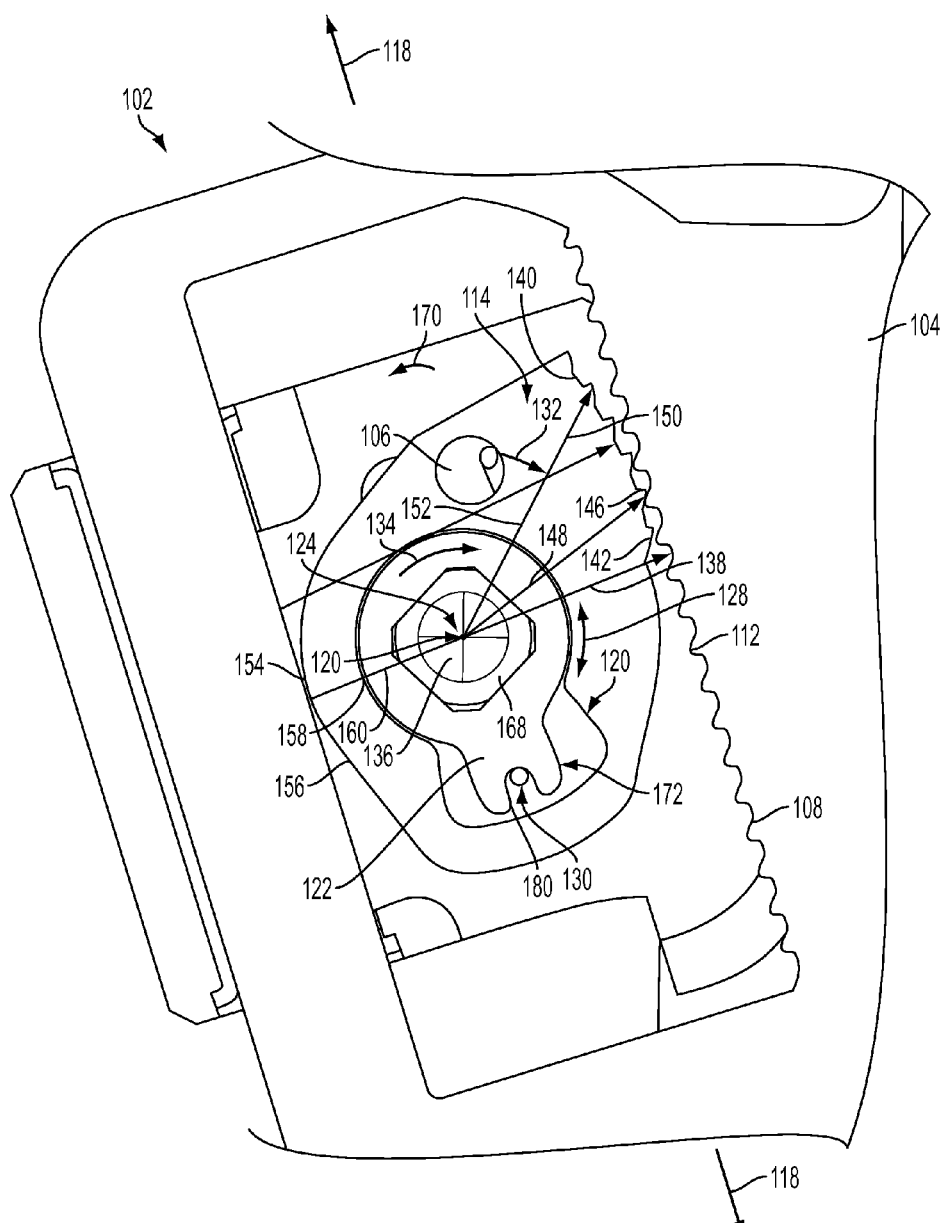
FIG. 3 illustrates a side view of an exemplary position lock for a steering column.

A tooth lock 114 is supported for rotation about a tooth lock rotation axis 120, and a driver 122 is supported for rotation about a driver rotation axis 124. In an exemplary embodiment, both the tooth lock rotation axis 120 and the driver rotation axis 124 correspond to the longitudinal axis of a rake lock control shaft 136, which is coupled to the steering column lock arm 184. The steering column lock arm 184 is coupled to the rake lock control shaft 136 such that steering column lock arm 184 facilitates application of a torque upon the rake lock control shaft 136 in either a locking direction 134 (FIG. 3) or an adjustment direction 170 (FIG. 3). In an exemplary embodiment, a cam 110 operates in conjunction with the steering column lock arm 184 so as to limit the absolute range of rotation of the rake lock control shaft 136 so as to prevent application of excessive loads upon the tooth lock 114 or other components of the position lock 102.

A tooth lock cartridge 176 may be used in connection with the cam 110 to limit the absolute range of rotation of the rake lock control shaft 136. In addition, the tooth lock cartridge 176 may be used along with the rake lock bracket 104 to define the range of translational motion of the rake lock control shaft 136 as well as that of the tooth lock 114 and the driver 122. A spring 130 is arranged so as to aid in control of the tooth lock 114. The tooth lock 114 is configured for selectively engaging and disengaging from the rake lock tooth wall 108 and the plurality of rake lock teeth 112, in response to rotation of the rake lock control shaft 136, so as to selectively resist or facilitate translation of the tooth lock 114 in the raking direction 118.

In an exemplary embodiment, the rake lock control shaft 136 is translationally fixed to both the steering column 116 and the tooth lock 114 such that when the steering column 116 undergoes raking movement, the rake lock control shaft 136 and the tooth lock 114 also undergo raking movement. Accordingly, when the tooth lock 114 is prevented from undergoing raking movement, the rake lock control shaft 136 and the steering column 116 are also prevented from undergoing raking movement. In an exemplary embodiment, the tooth lock 114 is coupled to the steering column 116 for movement with the steering column 116 in a raking direction 118, and, as shown in FIG. 2, the driver 122 is supported for translation with the tooth lock 114.

Figure 4:
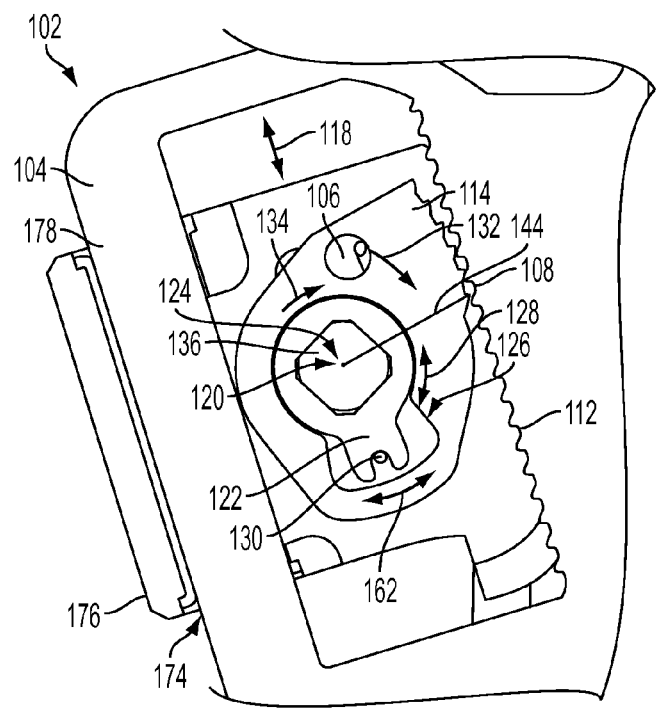
FIG. 4 illustrates a side view of an exemplary position lock for a steering column in a locked mode.
Figure 5:
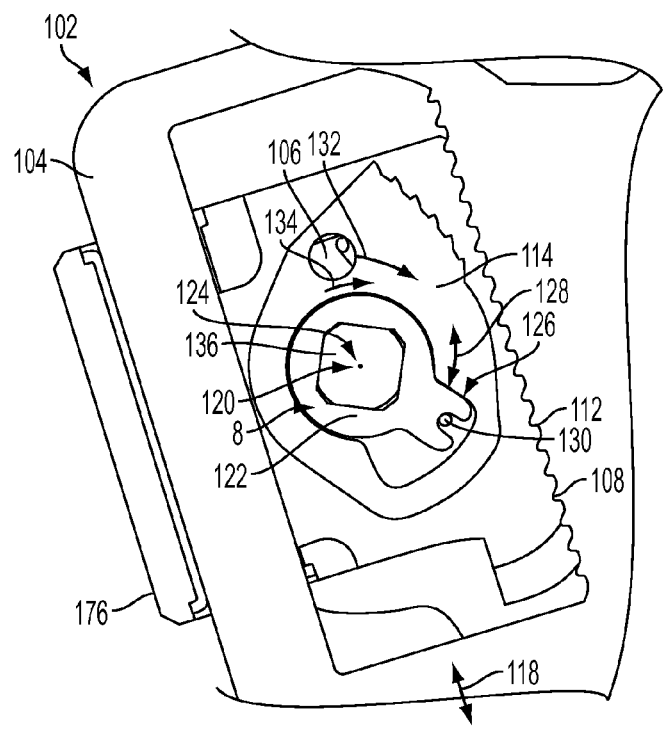
FIG. 5 illustrates a side view of an exemplary position lock for a steering column in an adjustment mode.

FIG. 3, FIG. 4, and FIG. 5 show side views of a portion of an exemplary position lock 102 in various stages of operation. As shown in FIG. 3, the driver 122 is configured and positioned for contacting an actuation feature 126 of the tooth lock 114 within an active range of rotation 128 of the driver 122 so as to cause the tooth lock 114 to rotate with the driver 122 as the driver 122 rotates within the active range of rotation 128. The spring 130 is configured and arranged so as to apply a biasing moment 132 tending to cause the tooth lock 114 to rotate in a locking direction 134. The tooth lock 114 is disposed on the rake lock control shaft 136 for rotation about the rake lock control shaft 136. The driver 122 is also disposed on the rake lock control shaft 136, but, unlike the tooth lock 114, the driver 122 is coupled to the rake lock control shaft 136 for rotation with the rake lock control shaft 136.

In an exemplary embodiment, the tooth lock 114 is disposed so as to define a tooth lock working distance 138 between the rake lock tooth wall 108 and the tooth lock rotation axis 120. The tooth lock 114 defines a toothed peripheral edge 140 proximate the rake lock tooth wall 108. A first tooth 142 on the toothed peripheral edge 140 is disposed at a first tooth distance 144 from the tooth lock rotation axis 120. The first tooth distance 144 is greater than the tooth lock working distance 138. A second tooth 146 on the toothed peripheral edge 140 is disposed at a second tooth distance 148 from the tooth lock rotation axis 120. The second tooth distance 148 is greater than the first tooth distance 144. A third tooth 150 on the toothed peripheral edge 140 is disposed at a third tooth distance 152 from the tooth lock rotation axis 120. The third tooth distance 152 is greater than the second tooth distance 148.

Once the first tooth 142 contacts (i.e., touches or becomes engaged) with a mating tooth of the plurality of rake lock teeth 112 on the tooth lock wall 108, further urging of the center of the tooth lock 114 in the raking direction coupled with the interlocking engagement of the first tooth 142 with the mating tooth, imposes a moment on the tooth lock 114 in the locking direction. This moment, coupled with the increasing tooth distances 148, 152 associated with the second and third teeth 146, 150, relative to the tooth distance 144, tends to force the tooth lock 114 into further, and more secure, engagement with the rake lock tooth wall 108.

It should be appreciated that, as the tooth lock 114 is urged toward further engagement with the rake lock tooth wall 108, the tooth lock rotation axis 120 may be urged to reside at a position that is further from the rake lock tooth wall 108 than when only the first tooth 142 is in engagement. Accordingly, the rotation of the tooth lock 114 may tend to urge an increase in the tooth lock working distance 138. To oppose such movements to the tooth lock rotation axis 120 or to the tooth lock working distance 138, a stabilizer may be implemented in the static structure adjacent to the tooth lock 114 so as to cooperate with the tooth lock 114 in resisting or limiting such movements. For example, in an exemplary embodiment, a tooth lock cartridge 176 may be configured to provide one or more abutments positioned so as to resist or limit such movements of the tooth lock 114. Similarly, an abutment may be positioned adjacent to the rake lock control shaft 136 so as to resist or limit excessive deflection in the rake lock control shaft 136. In configurations wherein the rake lock 114 is coupled to the rake lock control shaft 136, movements in the rake lock 114 can be resisted.

Still further, the rake lock bracket 104 may provide a backstopping mechanism to resist or limit such movements of the tooth lock 114. In an exemplary embodiment, the rake lock bracket 104 has a stabilizing wall 154 disposed substantially parallel to the rake lock tooth wall 108. The stabilizing wall 154 (or other abutment feature) is configured to facilitate sliding contact with a substantially smooth peripheral edge 156 of the tooth lock 114. The tooth lock rotation axis 120 is disposed a distance from the stabilizing wall 154 so as to define a stabilizing distance 158. The tooth lock 114 is configured for engaging the stabilizing wall 154 so as to resist or prevent undesirable changes in the tooth lock working distance 138, and this may be accomplished by maintaining a desirable stabilizing distance 158. The tooth lock 114 defines the substantially smooth peripheral edge 156 proximate the stabilizing wall 154 or other abutment feature. The peripheral edge 156 is disposed at a desirable (e.g., substantially constant, varying in a manner that is complementary to the profile of the toothed peripheral edge) radial distance 160 from the tooth lock rotation axis 120. By setting an appropriate profile for the radial distance 160 (e.g., being approximately equal to the stabilizing distance 158, etc.), the interaction of the peripheral edge 156 and the stabilizing wall 154 or other abutment feature (or the interaction of the rake lock control shaft 136 with an abutment feature may assist in resisting or limiting undesirable movements of the tooth lock 114 and the rake lock control shaft 136.

In an exemplary embodiment, the driver 122 is configured and positioned for rotating through a passive range of rotation 162 of the driver 122 that differs from the active range of rotation 164 of the driver 122. The driver 122 is configured and positioned for avoiding contact with the actuation feature 126 of the tooth lock 114 within the passive range of rotation 162 of the driver 122 so as to avoid causing the tooth lock 114 to rotate with the driver 122 within the passive range of rotation 162 of the driver 122. In an exemplary embodiment, the driver 122 is in engagement with a spring 130 such that as the driver rotates in the adjustment direction 170, the biasing force decreases. In an exemplary embodiment, the driver 122 is in engagement with a spring 130 such that as the driver 122 rotates in the locking direction 134, the biasing force increases.

In an exemplary embodiment, the rake lock control shaft 136 is arranged substantially transversely to the raking direction 118, each tooth of the plurality of rake lock teeth 112 is oriented substantially transversely to the raking direction 118, and each tooth of the plurality of rake lock teeth 112 is disposed substantially transversely to a longitudinal axis 166 defined by the steering column 116. In an exemplary embodiment, the raking direction 118 is substantially transverse to a longitudinal axis 166 defined by the steering column 116. In an exemplary embodiment, the rake lock control shaft 136 is arranged substantially transversely to a longitudinal axis 166 of the steering column 116, and the raking direction 118 is substantially vertical.

In an exemplary embodiment, the rake lock bracket 104 provides a guide structure on which a tooth lock cartridge 176 may ride. The tooth lock cartridge 176 has a guide pocket 174 that cooperates with the guide structure so as to maintain the position of the tooth lock rotation axis 120, the driver rotation axis 124, and the longitudinal axis of the rake lock control shaft 136. In an exemplary embodiment, the driver 122 is configured to key to one or more flats or eccentricities of the rake lock control shaft 136. Accordingly, the driver 122 may be configured so as to define an eccentric hole 168 through which the rake lock control shaft 136 is disposed. The driver 122 may define a driver control arm 172 configured to contact and cooperate with actuation feature 126 of the tooth lock 114 so as to cause the toothed peripheral edge 140 on tooth lock 114 to disengage from the plurality of rake lock teeth 112 on rake lock bracket 104. Accordingly, whenever the rake lock control shaft 136 is rotated in an adjustment direction 170 sufficiently to cause driver 122 to contact actuation feature 126 of tooth lock 114, the position lock 102 may facilitate adjustment of the steering column 116.

It should be noted that the tooth lock 114 is configured to rotate freely about the rake lock control shaft 136. In an exemplary embodiment, the spring 130 engages the driver 122 at a recess 180 in the driver control arm 172. The spring 130 also engages the tooth lock 114 by a biasing hole 106.

When the toothed peripheral edge 140 on the tooth lock 114 contact the plurality of rake lock teeth 112 on the rake lock bracket 104, tension develops in the spring 130, tending to bias the tooth lock 114 toward engagement of additional teeth, however, further rotation of the driver 122 and its driver control arm 172 are not inhibited. It should be appreciated that a position lock 102 such as described herein may be implemented on one or both sides of a steering column 116.

FIG. 4 illustrates portions of an exemplary position lock 102 in a locked mode. As shown in FIG. 4, the tooth lock 114 is configured for engaging, upon rotation in the locking direction 134, at least one tooth of the plurality of rake lock teeth 112 so as to selectively resist translation of the tooth lock 114 and the steering column 116 in the raking direction 118.

FIG. 5 illustrates portions of an exemplary position lock 102 in an adjustment mode. As shown in FIG. 5, the tooth lock 114 is configured for disengaging, upon rotation in an adjustment direction 170, from the at least one tooth of the plurality of rake lock teeth 112 so as to selectively facilitate translation of the tooth lock 114 and the steering column 116 in the raking direction 118. More specifically, as shown in FIG. 5, driver control arm 172 of driver 122 contacts actuation feature 126 on tooth lock 114, thereby causing toothed peripheral edge 140 on tooth lock 114 to disengage from the plurality of rake lock teeth 112 on rake lock bracket 104.

Thus, the present invention provides a locking mechanism that avoids many of the problems inherent in existing systems. In accordance with an exemplary embodiment of the invention locking teeth are configured so as to roll or rotate into engagement such that the locking engagement of the teeth becomes tighter and more secure as forces to overcome the locking engagement are applied. The disclosed driver configuration enables decoupling of the actuation lever from the locking device.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A position lock for selectively resisting or facilitating raking movement of a steering column of a vehicle, the position lock comprising:

a rake lock bracket fixed to the vehicle and disposed adjacent to the steering column along a direction of raking movement of the steering column, the rake lock bracket having a rake lock tooth wall that bounds a control slot and that defines a plurality of rake lock teeth;

a tooth lock coupled to the steering column for movement with the steering column in a raking direction and supported for rotation about a tooth lock rotation axis;

a driver supported for translation with the tooth lock and for rotation about a driver rotation axis, the driver configured and positioned for contacting an actuation feature of the tooth lock within an active range of rotation of the driver so as to cause the tooth lock to rotate with the driver as the driver rotates within the active range of rotation of the driver; and a spring configured and arranged so as to apply a biasing moment tending to cause the tooth lock to rotate in a locking direction;

the tooth lock being configured for engaging, upon rotation in the locking direction, at least one tooth of the plurality of rake lock teeth so as to selectively resist translation of the tooth lock and the steering column in the raking direction;

the tooth lock being configured for disengaging, upon rotation in an adjustment direction, from the at least one tooth of the plurality of rake lock teeth so as to selectively facilitate translation of the tooth lock and the steering column in the raking direction.

2. The position lock as in claim 1, further comprising a rake lock control shaft that is translationally fixed to both the steering column and the tooth lock such that, when the steering column moves in the raking direction, the rake lock control shaft and the tooth lock also undergo raking movement and such that when the tooth lock is prevented from undergoing raking movement, the rake lock control shaft and the steering column are prevented from undergoing raking movement.

3. The position lock as in claim 2, wherein the tooth lock is disposed on the rake lock control shaft for rotation about the rake lock control shaft.

4. The position lock as in claim 3, wherein the driver is disposed on the rake lock control shaft and coupled to the rake lock control shaft for rotation with the rake lock control shaft.

5. The position lock as in claim 2, wherein the rake lock control shaft is arranged substantially transversely to said direction of raking movement.

6. The position lock as in claim 2, wherein the rake lock control shaft is arranged substantially transversely to a longitudinal axis of the steering column.

7. The position lock as in claim 1:
wherein the tooth lock is disposed so as to define a tooth lock working distance between the rake lock tooth wall and the tooth lock rotation axis;
wherein the tooth lock defines a toothed peripheral edge proximate the rake lock tooth wall, a first tooth on the toothed peripheral edge being disposed at a first tooth distance from the tooth lock rotation axis; and
wherein the first tooth distance is greater than the tooth lock working distance.

8. The position lock as in claim 7:
wherein a second tooth on the toothed peripheral edge is disposed at a second tooth distance from the tooth lock rotation axis; and
wherein the second tooth distance is greater than the first tooth distance.

9. The position lock as in claim 8:
wherein a third tooth on the toothed peripheral edge is disposed at a third tooth distance from the tooth lock rotation axis; and
wherein the third tooth distance is greater than the second tooth distance.

10. The position lock as in claim 7:
wherein the rake lock bracket has a stabilizing wall disposed substantially parallel to the rake lock tooth wall;
wherein the stabilizing wall is configured to facilitate sliding contact with an edge of the tooth lock;
wherein the tooth lock rotation axis is disposed a distance from the stabilizing wall so as to define a stabilizing distance; and
wherein the tooth lock is configured for engaging the stabilizing wall so as to maintain as constant the tooth lock working distance.

11. The position lock as in claim 10:
wherein the tooth lock defines a peripheral edge proximate the stabilizing wall,
wherein the peripheral edge proximate the stabilizing wall is substantially smooth and is disposed a substantially constant radial distance from the tooth lock rotation axis, and
wherein the substantially constant radial distance is approximately equal to the stabilizing distance.

12. The position lock as in claim 1, wherein the driver is configured and positioned for rotating through a passive range of rotation of the driver that differs from the active range of rotation of the driver, the driver configured and positioned for avoiding contact with the actuation feature of the tooth lock within the passive range of rotation of the driver so as to avoid causing the tooth lock to rotate with the driver within the passive range of rotation of the driver.

13. The position lock as in claim 1, wherein each tooth of said plurality of rake lock teeth is oriented substantially transversely to the raking direction.

14. The position lock as in claim 1, wherein each tooth of the plurality of rake lock teeth are disposed substantially transversely to a longitudinal axis defined by the steering column.

15. The position lock as in claim 1, wherein said raking direction is substantially transverse to a longitudinal axis defined by said steering column.

16. The position lock as in claim 1, wherein said raking direction is substantially vertical.

17. The position lock as in claim 1, wherein the driver is in engagement with a spring such that as the driver rotates in the adjustment direction, a biasing force imposed by the spring on the tooth lock decreases.

18. The position lock as in claim 1, wherein the driver is in engagement with a spring such that as the driver rotates in the locking direction, a biasing force imposed by the spring on the tooth lock increases.

19. A method for selectively resisting or facilitating raking movement of a steering column of a vehicle comprising:
fixing a rake lock bracket to the vehicle adjacent to the steering column along a direction of raking movement of the steering column, the rake lock bracket having a rake lock tooth wall that bounds a control slot and that defines a plurality of rake lock teeth;
coupling a tooth lock to the steering column for movement with the steering column in a raking direction and supporting the tooth lock for rotation about a tooth lock rotation axis;
supporting a driver for translation with the tooth lock and for rotation about a driver rotation axis;
configuring and positioning the driver for contacting an actuation feature of the tooth lock within an active range of rotation of the driver so as to cause the tooth lock to rotate with the driver as the driver rotates within the active range of rotation of the driver;
rotating the tooth lock in a locking direction so as to engage at least one tooth of the plurality of rake lock teeth and thereby selectively resist translation of the tooth lock and the steering column in the raking direction; and
rotating the tooth lock in an adjustment direction so as to disengage from the at least one tooth of the plurality of rake lock teeth and hereby selectively facilitate translation of the tooth lock and the steering column in the raking direction.

20. The method as described in claim 19, further comprising translationally fixing a rake lock control shaft to both the steering column and the tooth lock such that when the steering column moves in a raking direction, the rake lock control shaft and the tooth lock also undergo raking movement and such that when the tooth lock is prevented from undergoing raking movement, the rake lock control shaft and the steering column are prevented from undergoing raking movement.

* * * * *